UNITED STATES PATENT OFFICE.

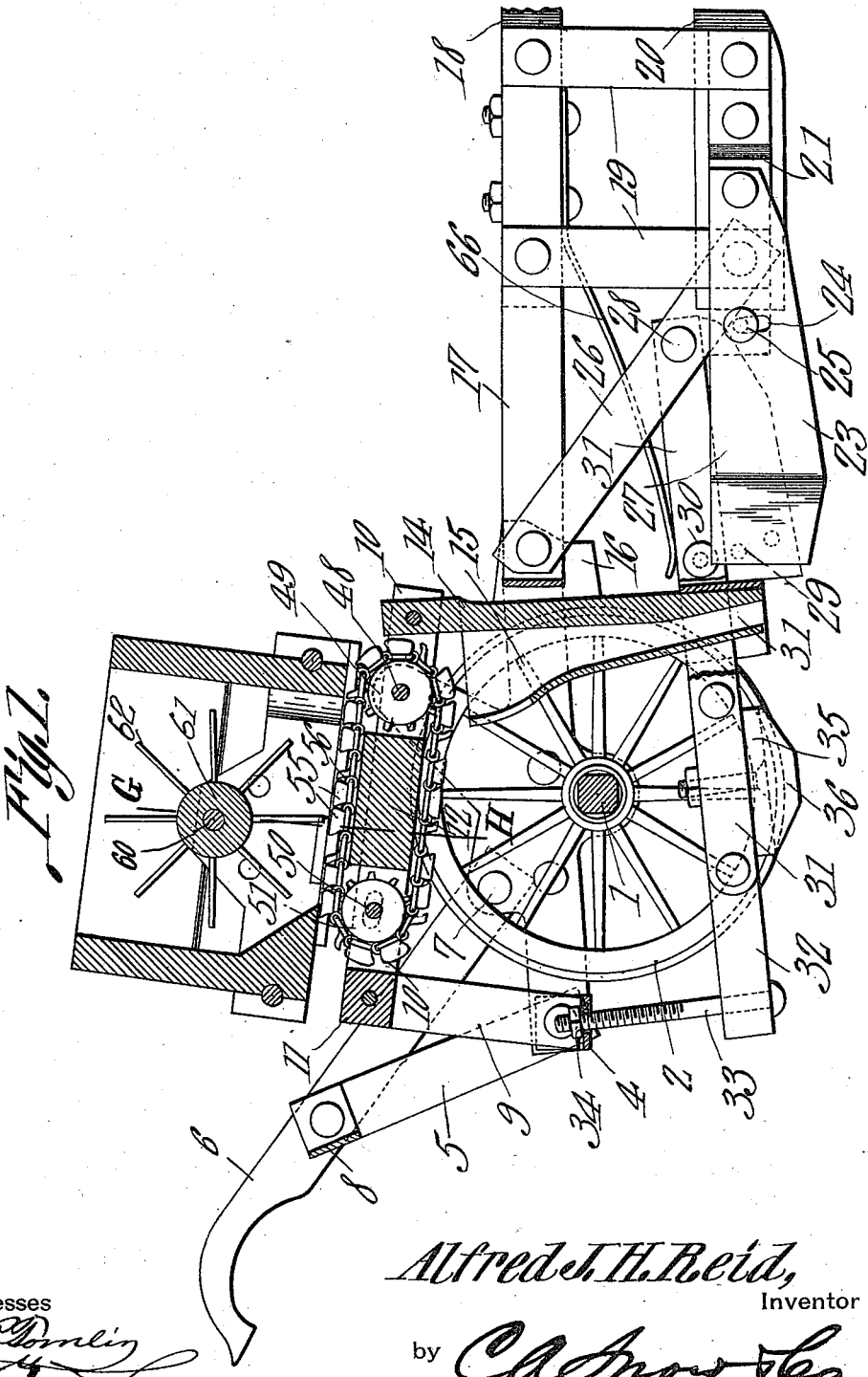

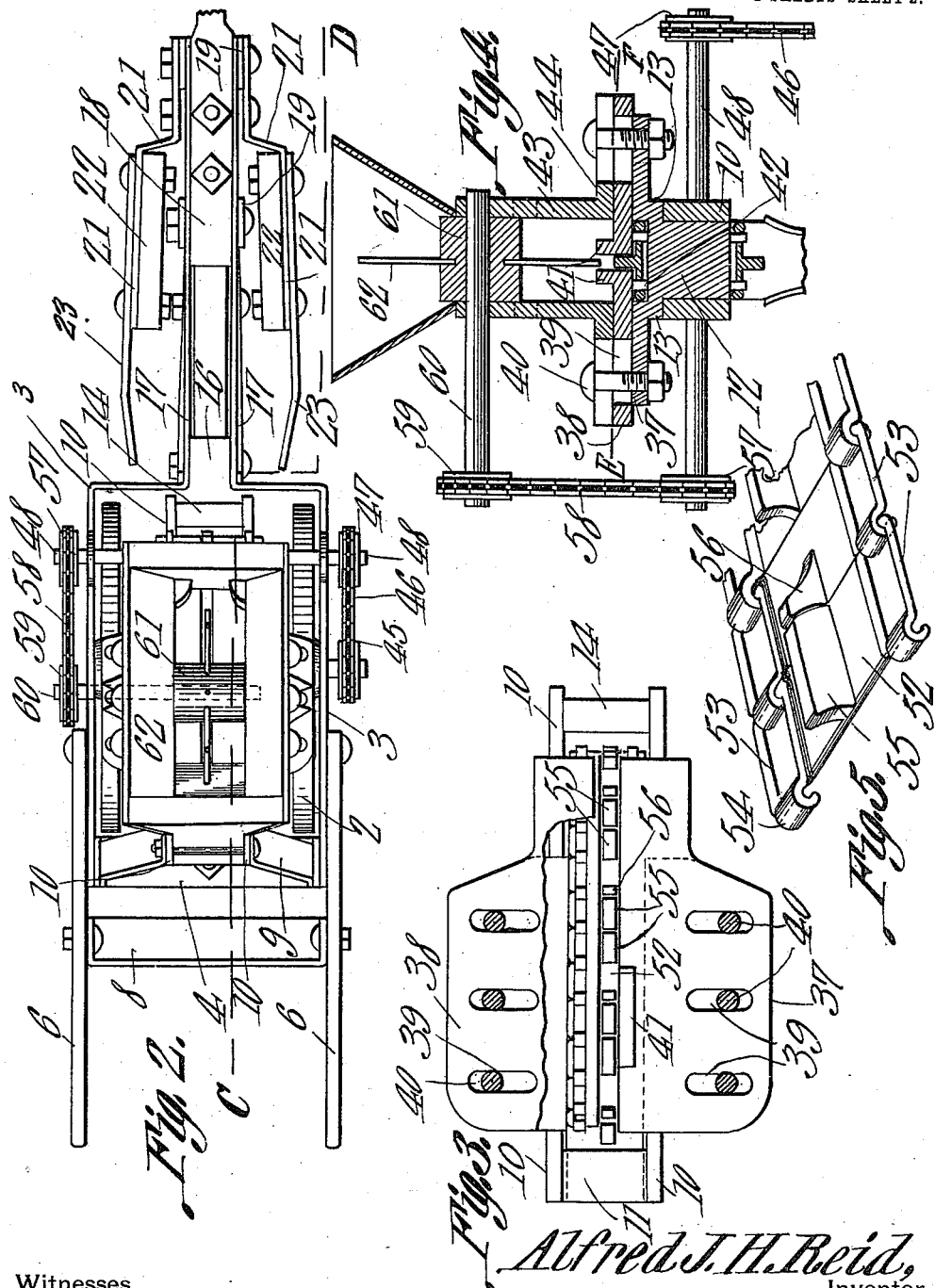

ALFRED J. H. REID, OF HENDERSON, TENNESSEE.

PLANTER.

976,292.  Specification of Letters Patent.  Patented Nov. 22, 1910.

Application filed May 14, 1910. Serial No. 561,426.

*To all whom it may concern:*

Be it known that I, ALFRED J. H. REID, a citizen of the United States, residing at Henderson, in the county of Chester and State of Tennessee, have invented a new and useful Planter, of which the following is a specification.

This invention relates to machines for planting corn, cotton, peas, beans and other smaller seeds and one of its objects is to provide a compact machine of this character having new and novel means for dropping the seeds at desired intervals, the said means being disposed beneath a hopper located directly above the axes of the supporting wheels.

A still further object is to provide seed dropping mechanism which can be used in connection with any kind of seed such as ordinarily fed by gravity.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a central longitudinal section through the machine, the front or grading portion being shown in elevation, said section being taken on the line C—D Fig. 2. Fig. 2 is a top plan view of the machine. Fig. 3 is a horizontal section through a portion thereof on line E—F Fig. 4 and showing the controlling chain of the seed dropping mechanism in plan, the adjustable guide plates being also shown in plan adjacent thereto, one of the said plates being partly broken away. Fig. 4 is a central vertical transverse section through the seed dropping mechanism said section being taken on the line G—H, Fig. 1. Fig. 5 is a perspective view of a portion of the feed chain of said mechanism.

Referring to the figures by characters of reference 1 designates a wheel supported axle, the said supporting wheels being indicated at 2. Side frame members 3 are mounted on the end portions of the axle 1 and are connected at their rear ends by a cross bar 4. Standards 5 extend upwardly from the rear end portions of the side members 3 and are connected to handles 6 which are inclined downwardly and forwardly and are secured to the side members 3 as indicated at 7.

The two handles 6 may be connected at the upper ends of the standards 5, by means of a cross strip 8 and upwardly converging supporting members 9 may be secured to the side members 3 close to the ends of the cross bar 4, the upper ends of these members 9 being bolted or otherwise secured to the rear ends of parallel longitudinally extending side strips 10. A spacing block 11 is secured between the rear ends of these side strips and a combined spacing member and table 12 is interposed between the intermediate portions of the strips. This table preferably has laterally extending flanges 13 which bear downwardly on the side strips, as shown particularly in Fig. 4. The front ends of the side strips are spaced apart by the upper end of a hanger 14 the said hanger extending downwardly close to the ground and constituting the front wall of a spout or chute 15 which is open at the top and bottom.

A block 16 extends forward from the hanger 14 and the side members 3 extend inwardly to and are fastened on opposite faces of this block 16 and then extend forward along parallel lines, as indicated at 17 and are secured to opposite faces of a draft tongue 18.

Hangers 19 extend downwardly from each side of the tongue 18 and are secured, at their lower ends, to a runner 20 having wings 21 secured to the sides thereof and extending rearwardly therefrom. Each of these wings is preferably formed of spring metal and is fastened to a block 22. A scraper blade 23 is pivotally connected, at its forward end, to each of the blocks 22 and has an arcuate slot 24 therein for the reception of a clamping bolt 25, it being thus possible to raise or lower the rear end of the scraper blade so as to cause it to project any distance desired into the soil. The two blades 23 are curved inwardly at their rear ends so that, as the machine is drawn forward, these blades will not only scrape and smooth the surface of the soil, but will direct the loosened soil inwardly to a position back of the runner 20.

Braces 26 connect the block 16 with the rear end of the runner 20 and a furrow opener 27 is pivotally connected, at its front end, to these braces 26, the said opener being extended between the braces. The pivot on which the opener is mounted, has been indicated at 28. The rear end of the said furrow opener has a series of openings 29 therein any one of which is adapted to receive a locking bolt 30 which extends through the said furrow opener and also through said strips 31 which rest upon the side faces of the furrow opener and moves therewith. These strips 31 extend across the sides of the spout or chute 15 and are bolted or otherwise secured to a bar 32 which extends under the axle 1 and has a supporting bolt 33 loosely mounted in the rear end thereof. This bolt extends upwardly to and loosely through the cross bar 4 and has an adjusting nut 34 mounted upon it and whereby the said bolt can be shifted vertically so as to swing the bar 32, side strip 31 and furrow opener 27 about the pivot 28. It is of course to be understood that the strips 31 do not engage the walls of the chute or spout 15 and can therefore be swung about the pivot 28 without causing a corresponding movement of the said spout.

A seed coverer is carried by the bar 32 and consists of a block 35 having laterally extending downwardly bowed wings 36. This coverer is arranged directly back of the spout 15 and extends therebelow, as clearly indicated in Fig. 1.

The flanges 13 of the table 12 are provided with lateral extensions 37 on which are mounted adjustable guide plates 38 each of which has transversely extending slots 39 therein for the reception of clamping bolts 40 which project into and are secured to the extensions 37. The inner longitudinal edges of the guide plates have upstanding longitudinally extending ribs 41 thereon. These inner edge portions overhang the table 12 but are spaced therefrom, thus forming a channel 42 above the table and which is for the purpose hereinafter set forth. A hopper 43 is mounted on the guide plates 38 and has laterally extending slotted ears 44 which are engaged by the bolts 40 and the said bolts thus serve not only to adjustably fasten the plates 38 to the extensions 37, but also to secure the hopper 43 in position upon the guide plates.

A sprocket 45 is secured to and rotates with the axle 1 and drives a chain 46 which is mounted on a sprocket 47. This last mentioned sprocket is secured to a shaft 48 journaled in the front portions of the side strips 10 and extending between the hanger 14 and the table 12, there being sprockets 49 secured to the shaft 48 between but close to the said side strips 10. Another shaft 50 is journaled within the side strips between the table 12 and the block 11 and carries sprockets 51 which are located close to the side strips 10.

Sprockets 49 and 51 carry a chain made up of links which are detachably connected and are made preferably of two styles. Two of these links have been illustrated in detail in Fig. 5. It will be seen that each link consists of a plate 52 having a slot 53 in each end portion thereof and which is of sufficient size to receive the teeth of the sprocket wheel. A hook 54 extends from one end of each of the slots and the other end wall of each slot is so shaped as to be loosely engaged by a hook 54 of another link. One form of link has a central rib 55 uptsanding therefrom and provided with a concave and a convex end, the said rib extending throughout the length of the link. The other form of link has an ear 56 upstanding therefrom at the center thereof and which does not extend throughout the length of the link but has one round edge or concave end registering with one of the edges of the link and adapted to receive the convex end of a rib such as shown at 55. It is to be understood that these links may be disposed in any desired relation, it being possible to arrange a series of links having ribs 55 and ears 56 disposed in any desired relation to each other. For example one or more ribs 55 can be placed together after which one or more ears 56 can be placed in alinement therewith. The ribs and ears are so proportioned as to fit snugly between the inner edges of the guide plate 38 and the ribs 41 and it will obviously be impossible for any seed to leave the hopper or seed box except when one or more of the ears 56 assumes a position within the channel 42, whereupon one or more seeds may fall by gravity into the space between the ears or between the ears and the ribs 55. It is to be understood that the upper run of the chain will rest upon the table 12 while the lower run thereof will hang loosely below the table.

A sprocket 57 is secured to the shaft 48 and drives a chain 58 which engages another sprocket 59. This last mentioned sprocket is secured to a shaft 60 extending transversely through and journaled within the walls of the hopper. An agitator is adapted to be secured upon the shaft 60 and within the hopper, the form of agitator varying according to the seed used in the planter. Where cotton seed is to be planted, a hub 61 is secured to the shaft 60 and has radially extending fingers 62 thereon. It will be seen therefore that as the machine moves forward, the fingers 62 will be rotated about the shaft 60 and will thoroughly agitate the seed, it being noted that these fingers extend between the ribs 41 and close to the feed chain and force the cotton seed into the space between the ears 56 or between the ears and the ribs 55 on the chain.

After the hopper 43 has been filled with seed, the machine may be drawn forward as ordinarily and the runner 20, riding along the ground, will tend to level the ground by wearing down any small projecting portion of the soil and forcing it into hollows in the path of the runner. At the same time the scrapers 23, which have previously been adjusted to desired angles relative to the horizontal, will scrape a portion of the soil inwardly to a position back of the runner and in the path of the opener 27. This opener will cut a furrow in the loosened soil and the spout or chute 15 following directly thereafter will direct seed into the said furrow. The covering device 35 follows after the discharge end of the spout and the side wings thereof serve to direct the loosened soil inwardly over the seed and produce a rounded hill which is not only attractive in appearance but has a water furrow at each side thereof. The rotation of the wheels 2 causes power to be transmitted to the gearing described, to the shaft 48 and sprocket 49 and the chain mounted on the sprocket is thus moved in the direction of its length, the ribs and ears 55 and 56 thereon being brought successively into the channel 42. Should all of the links of the chain be provided with ears 55, it would be impossible for any seed to drop into the channel and be conveyed by the chain to the upper end of the spout. However, by placing links with ears 56 at desired intervals the seeds can be permitted to drop in front of the said ears and will be forced thereby to the inlet end of the chute. Obviously by varying the distances between the ears 56, the distance between the hills can be regulated. Moreover by grouping two or more of the ears 56 together, the amount of seed dropped into each hill can be controlled.

By adjusting the supporting bolt 33, the seed can be planted on either a packed bed or a loose bed. The depth of planting can be controlled by lowering the furrow opener 27 until it hangs below the block 35 a distance equal to the depth at which the seeds are to be planted.

By referring to Fig. 1 it will be seen that a spring 66 is secured to the rear portion of the tongue 18 and bears downwardly on the furrow opener 27. This spring serves to press the opener yieldingly into contact with the ground at all times, but, should it come into engagement with a root or other unyielding object in the path thereof, the said opener will be free to swing upwardly about its pivot 28 and against the stress of the spring 66 this movement being permitted in view of the fact that the bolt 33 is slidably mounted in the bar 4. As soon as the obstruction has been passed, the spring 66, assisted by gravity, will return the parts to their initial positions.

It is of course to be understood that various changes may be made in the construction and arrangement of the parts without departing from the spirit or sacrificing any of the advantages of the invention as defined in the appended claims.

What is claimed is:—

1. A planter including a hopper, said hopper having a discharge channel in the bottom thereof, an endless chain below the hopper, said chain consisting of interchangeable links having outstanding ribs extending throughout the lengths thereof and links having outstanding projections alining with the ribs, said ribs and projections extending into the channel and constituting seed engaging means, and means for actuating the chain to convey seeds.

2. A planter including a spout, a table adjacent the upper end thereof, oppositely disposed laterally adjustable guide plates mounted upon the tables, an endless feed chain extending over and under the table, said chain consisting of pivotally connected links, ribs upon certain of the links, and ears upon the remaining links, said ears and ribs alining and being movable between the guide plates, seed receiving recesses between the ears and between the ears and the adjoining ribs, and means for actuating the chain to direct seed to the spout.

3. A planter including a hopper, a spout, an endless means for conveying seeds from the hopper to the spout, said means including interchangeable links, and projecting devices upon the links and of different lengths, said devices coöperating to form seed receiving recesses therebetween at desired intervals.

4. A planter including a chute, a hopper, agitating means within the hopper, an outlet channel in the bottom of the hopper, and endless means for conveying seed from the hopper and along the channel to the spout, said means including interchangeable links having projections of different sizes movable within the channel and forming seed receiving recesses therebetween.

In testimony that I claim the foregoing as my own, I have hereto affixed my signature in the presence of two witnesses.

ALFRED J. H. REID.

Witnesses:
T. B. HARDEMAN,
J. R. GALBRAITH.